Patented Apr. 20, 1948

2,439,810

UNITED STATES PATENT OFFICE 2,439,810

SULFURIC ACID REACTION PRODUCT OF 2-MERCAPTO-4,6,6-TRIMETHYL THIAZINE

Jacob Eden Jansen, Akron, Ohio, assignor to The B. F. Goodrich Company, New York, N. Y., a corporation of New York No Drawing. Application July 31, 1946, Serial No. 687,521

5 Claims. (Cl. 260—243)

This invention relates to new compositions of matter and pertains more particularly to the reaction product of 2-mercapto-4,6,6-trimethylthiazine with sulfuric acid of a concentration of 80% or greater, as well as to the metal salts of the reaction product.

More particularly, the invention comprises subjecting 2-mercapto-4,6,6-trimethylthiazine to the action of concentrated sulfuric acid, 80% to oleum, and maintaining the temperature of the reaction mixture at that which the exothermic reaction has created (about 70 to 80° C. when the reactants are initially at room temperature) until the evolution of sulfur dioxide has ceased. The resulting product is isolated by allowing the mass to cool to about 50° C., then adding cold water to the mixture with stirring, at which time the reaction product forms as a finely-divided solid, and recovering the product by filtration.

The alkali metal salts of the reaction product, such as the sodium and potassium salts, are water soluble and are prepared simply by adding the reaction product to a concentrated alkali solution and then removing the water by evaporation. Other metal salts are generally water insoluble and are quite easily prepared by adding an aqueous solution of a salt of the desired metal to an aqueous solution of an alkali metal salt of the reaction product. For example, such metal salts of the reaction product as the cadmium, zinc, lead, iron, manganese, magnesium, nickel, copper, calcium, barium, aluminum and mercury salts can be prepared in this manner.

2-mercapto-4,6,6-trimethyl thiazine which is used in preparing the compositions of this invention can be prepared by reacting dithiocarbamic acid with mesityl oxide, preferably by adding a salt of dithiocarbamic acid to a mixture of mesityl oxide with an aqueous solution of hydrochloric acid at a temperature of about 0 to 40° C. and then heating the reaction mixture, as is more fully described in my copending application Serial No. 557,384, filed October 5, 1944, particularly in Example I thereof.

The following specific examples of the preparation of the product of the reaction of 2-mercapto-4,6,6-trimethylthiazine with concentrated sulfuric acid and the preparation of the metal salts of the reaction product are intended to be illustrative only.

Example I 250 parts by weight of 2-mercapto-4,6,6-trimethylthiazine and 300 parts by weight of concentrated sulfuric acid (95.5% H₂SO₄) were mixed together in an acid resistant container. The bright red viscous solution that formed was accompanied by a good evolution of sulfur dioxide and a rise in temperature from room temperature to about 75° C. The reaction mixture was stirred and heated at about 75° C. for about 30 minutes when the evolution of sulfur dioxide had essentially ceased. The mass was allowed to cool to about 50° C. and then 1000 parts by weight of cold water were added with stirring. The finely-divided yellow solid was recovered by filtration, washed and dried. 260 parts by weight of the reaction product were recovered and it was found that the product had an indefinite melting point in the range of 100° to 130° C.

In the above preparation and those that follow, the conditions given are not critical but merely those that give the best results, for substantially the same product can be obtained by varying the proportions and concentrations of reactants, etc. For example, the preferred concentration of sulfuric acid is given as 95.5%, but the range which can be used is between 80% H₂SO₄ and oleum. Then also, in each of the preparations, the amount of water recommended is not critical, but is the amount that was found to produce a slurry of proper consistency which could be easily handled by the ordinary methods employed in large-scale production. The above slurry can also be prepared by adding the reaction mixture to the water. This procedure is preferred for large-scale production, for it reduces localized heating brought about by the dilution of the acid where the water first enters the reaction mixture.

Example II

A slurry of 150 parts by weight of the reaction product of Example I and 1,000 parts by weight of water was made up. To this slurry was added 139 parts by weight of a caustic soda solution, 98% NaOH, which gave a clear, brown solution with which was mixed an aqueous solution containing 289 parts by weight of lead nitrate and 1500 parts by weight of water. A heavy paste was formed which thinned out during continued stirring, and the product was recovered by filtration, washed with water and dried with warm air. There was obtained 164 parts by weight of the lead salt of the reaction product, a dry tan, finely-divided solid, which melted at a temperature range of 125–155° C.

Example III

The zinc salt of the reaction product of Example I was made using 118 parts by weight of zinc chloride dissolved in 1500 parts by weight of water and the same amounts of other reactants and diluents as used in Example II. There was recovered 221 parts by weight of the zinc salt which was a finely-divided yellow solid having an indefinite melting point of 110–130° C.

My new compositions can be used as accelerators and activators for the vulcanization of natural and synthetic rubbers and as starting reactants for chemical synthesis. The sodium and potassium salts possess the properties of good wetting agents.

To illustrate the use of these compounds as accelerators of vulcanization, the following rubber compositions in which the parts are by weight, were prepared and vulcanized at 280° F.

|  | Parts |
|---|---|
| Natural rubber | 100 |
| Carbon black | 50 |
| Stearic acid | 3.5 |
| Pine tar | 3.0 |
| Zinc oxide | 5.0 |
| Antioxidant | 1.0 |
| Sulfur | 3.0 |
| Mercaptobenzothiazole (sample A) | 1.0 |

|  | Parts |
|---|---|
| Product of Example I (sample B) | 1.75 |
| Product of Example II (sample C) | 1.5 |
| Product of Example III (sample D) | 1.5 |

Sample A was prepared as a basis for comparing the activity of these new compounds as vulcanization accelerators. Sample A reached its maximum tensile strength of 4200 pounds per square inch after 75 minutes of vulcanization while sample B attained an ultimate tensile strength of 4200 pounds per square inch after only 45 minutes of vulcanization. Samples C and D reached an ultimate tensile strength of 3780 and 3400 pounds per square inch respectively after 75 minutes of vulcanization.

These new compositions are equally as effective for the vulcanization of sulfur vulcanizable synthetic rubbers such as the copolymers of butadiene-1,3 and styrene, and the copolymers of butadiene-1,3 and acrylonitrile. They are also effective with other sulfur vulcanizable rubbers such as reclaimed natural rubber, balata, gutta percha and the like.

While I have herein described specific methods for the preparation of the compounds of my invention, I do not desire nor intend to limit myself solely thereto, for, as hitherto stated, the precise proportions of the materials used may be varied and other materials having equivalent chemical properties may be employed, if desired, without departing from the spirit and scope of the invention as defined in the appended claims.

I claim:

1. A composition of matter selected from the class consisting of (1) the sulfuric acid reaction product of 2-mercapto-4,6,6-trimethylthiazine, said reaction product being formed by reacting 2-mercapto-4,6,6-trimethylthiazine with concentrated sulfuric acid of the concentration of 80% to oleum at a temperature of from about 20° C. to 75° C., the reaction being characterized by the evolution of a substantial amount of sulfur dioxide, heating the reaction mixture until evolution of sulfur dioxide has ceased, and separating the resulting reaction product, and (2) the metal salts of said reaction product.

2. The sulfuric acid reaction product of 2-mercapto-4,6,6-trimethylthiazine prepared by reacting 2-mercapto-4,6,6-trimethylthiazine with sulfuric acid of the concentration of 80% to oleum at a temperature of from about 20° C. to 75° C., the reaction being characterized by the evolution of a substantial amount of sulfur dioxide, heating the reaction mixture until evolution of sulfur dioxide has ceased, and separating the resulting reaction product.

3. The zinc salt of the sulfuric acid reaction product of 2-mercapto-4,6,6-trimethylthiazine, said reaction product being defined in claim 2.

4. The lead salt of the sulfuric acid reaction product of 2-mercapto-4,6,6-trimethylthiazine, said reaction product being defined in claim 2.

5. The method of preparing the sulfuric acid reaction product of claim 2 which comprises subjecting 2-mercapto-4,6,6-trimethylthiazine to the action of sulfuric acid of the concentration of about 80% to about that of oleum at a temperature of about 20° C. to 75° C., said reaction being characterized by the evolution of substantial quantities of sulfur dioxide, heating the reaction mixture until the evolution of sulfur dioxide has ceased, and separating the resulting reaction product.

JACOB EDEN JANSEN.